(12) United States Patent
Koeppe et al.

(10) Patent No.: US 6,906,434 B1
(45) Date of Patent: Jun. 14, 2005

(54) ELECTRIC UTILITY SYSTEM WITH SUPERCONDUCTING MAGNETIC ENERGY STORAGE

(75) Inventors: Paul Frederick Koeppe, Cross Plains, WI (US); Arnold P. Kehrli, Middleton, WI (US); John A. Diaz De Leon, II, Madison, WI (US); Donald L. Brown, Madison, WI (US); Warren Elliott Buckles, Madison, WI (US); Douglas C. Folts, Baraboo, WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/449,435

(22) Filed: Nov. 24, 1999

Related U.S. Application Data

(63) Continuation-in-part of application No. 09/240,751, filed on Jan. 29, 1999.
(60) Provisional application No. 60/117,784, filed on Jan. 29, 1999.

(51) Int. Cl.[7] .................................................. H02J 3/04
(52) U.S. Cl. ..................... 307/64; 307/103; 323/208; 323/233
(58) Field of Search .................. 307/64, 103, 102, 307/105; 323/208, 233, 205, 207; 361/62, 76, 88, 80; 363/40, 98

(56) References Cited

U.S. PATENT DOCUMENTS

| | | | |
|---|---|---|---|
| 4,128,805 A | | 12/1978 | Lanz |
| 4,328,551 A | | 5/1982 | Yamamura et al. |
| 5,134,356 A | | 7/1992 | El-Sharkawi et al. |
| 5,329,221 A | * | 7/1994 | Schauder .................... 323/207 |
| 5,329,222 A | | 7/1994 | Gyugyi et al. |
| 5,343,139 A | * | 8/1994 | Gyugyi et al. .............. 307/105 |
| 5,351,181 A | | 9/1994 | Brennen et al. |
| 5,422,561 A | | 6/1995 | Williams et al. |
| 5,514,915 A | * | 5/1996 | Kim et al. .................... 307/64 |
| 5,541,498 A | * | 7/1996 | Beckwith .................... 323/211 |
| 5,566,085 A | * | 10/1996 | Marceau et al. ............ 307/102 |
| 5,610,501 A | | 3/1997 | Nelson et al. |
| 5,631,545 A | | 5/1997 | Norman et al. |
| 5,703,791 A | | 12/1997 | Amano et al. |
| 5,939,798 A | | 8/1999 | Miller |
| 5,969,509 A | * | 10/1999 | Thorvaldsson ............... 323/210 |
| 6,359,423 B1 | * | 3/2002 | Noro .......................... 323/208 |
| 6,573,691 B2 | | 6/2003 | Ma et al. |
| 6,577,108 B2 | * | 6/2003 | Hubert et al. ............... 323/207 |

OTHER PUBLICATIONS

Laszlo Gyugyi, "Solid–State Synchronous Voltage Sources for Dynamic Compensation and Real–Time Control of AC Transmission Lines", 1993, IEEE Standard Press.*
Swain et al., "on Reactive Power Compensation", 1995, IEEE 0–7803–2559–1/95.*
MGE UPS SYSTEMS, "Second Generation of High Power Active Harmonic Conditioner based on the Current Injection Principle", Jun. 1998.*
Larry Borgard, "Grid Voltage Support at Your Fingertips", Nov. 1999, Transmission & Distribution World Magazine.
"Academic Press dictionary of science and technology", 1992, Academic Press, Inc., p. 489.

* cited by examiner

Primary Examiner—Brian Sircus
Assistant Examiner—Roberto J Rios
(74) Attorney, Agent, or Firm—Fish & Richardson P.C.

(57) ABSTRACT a voltage recovery device is configured to provide real and reactive power to a utility power network at a sufficient level and for a sufficient duration to recover the voltage on the utility power network within a predetermined proportion of the nominal voltage, following a fault condition detected on the utility power network. Moreover, the voltage recovery device reduces the overall transmission losses in a utility power system.

29 Claims, 7 Drawing Sheets

ELECTRIC UTILITY SYSTEM WITH SUPERCONDUCTING MAGNETIC ENERGY STORAGE

CROSS REFERENCE TO RELATED APPLICATIONS

This application is a continuation-in-part of U.S. application Ser. No. 09/240,751, which was filed on Jan. 29, 1999, the entire contents of which are incorporated herein by reference. This application also claims priority under 35 U.S.C. §119(e)(1) U.S. application Ser. No. 60/117,784, filed Jan. 29, 1999.

INCORPORATION BY REFERENCE

This application herein incorporates by reference the following applications: (1) U.S. patent application Ser. No. 09/449,375, entitled "Method And Apparatus For Providing Power To A Utility Power Network", filed on Nov. 24, 1999, now issued as U.S. Pat. No. 6,600,973; (2) U.S. patent application Ser. No. 09/449,376, entitled "Method And Apparatus For Controlling A Phase Angle", filed on Nov. 24, 1999, now issued as U.S. Pat. No. 6,414,853; (3) U.S. Provisional Application No. 60/167,377, entitled "Voltage Regulation Of A Utility Power Network", filed on Nov. 24, 1999; and (4) U.S. patent application Ser. No. 09/449,505, entitled "Electric Utility System With Superconducting Magnetic Energy Storage", filed on Nov. 24, 1999, now issued as U.S. Pat. No. 6,445,555.

BACKGROUND OF THE INVENTION

This invention relates to electric power utility networks including generating systems, transmission systems, and distribution systems serving loads. The power flowing on these networks is primarily in the form of alternating current and as such is familiar to those skilled in the art.

To remain competitive, electrical utility companies continually strive to improve system operation and reliability while reducing costs. To meet these challenges, the utility companies are developing techniques for increasing the life of installed equipment, as well as, diagnosing and monitoring their utility networks. Developing these techniques is becoming increasingly important as the size and demands made on the utility power grid continue to increase.

A utility power grid is generally considered to include both transmission line and distribution line networks for carrying voltages greater than and less than about 25 kV, respectively.

Referring to FIG. 1, a portion of a utility power is network is shown to include a transmission network 10 having generators 12, substations 14, and switching stations 16, all of which are interconnected via transmission lines 18. Transmission lines 18, in general, carry voltages in excess of 25 kilovolts (kV). With reference to FIG. 1, the voltage on a particular transmission line is approximately proportional to the thickness of the associated line in the figure. The actual transmission system voltages are indicated in the accompanying key located at the lower right.

Referring to FIG. 2, an exploded portion 10a of the utility power network of FIG. 1 includes distribution lines 20 coupled to a transmission line 18 through step-down transformers 22. Each distribution line carries power to loads 24 at voltage levels less than those levels associated with transmission lines (e.g., 25 kV or less).

Voltage instability on the utility power grid is a critical problem for the utility industry. In particular, when a fault occurs on the transmission grid, momentary voltage depressions are experienced, which may result in voltage collapse or voltage instability on the grid.

To better understand the dynamics of a fault on a utility power system, the sequence of events on the system due to a 3-phase fault on the transmission system will now be described. For example, referring again to FIG. 1, assume the fault occurs on a portion of the transmission network remote from a segment 70. Segment 70 lies between a substation 14a and a switching station 16a of transmission line network 10. Referring to FIG. 3, the voltage profile as a function of time at substation 14a due to the fault is shown. In this particular case, the voltage drops from a nominal 115 kV to about 90 kV. It is important to appreciate that if the fault were to occur more closely to segment 70 or on the segment itself, the drop in voltage is generally much more severe, and the voltage on the line can approach zero.

In general, such a fault appears as an extremely large load materializing instantly on the transmission system. In response to the appearance of this very large load, the transmission system attempts to deliver a very large current to the load (the fault). Detector circuits associated with circuit breakers on the transmission system detect the overcurrent situation immediately (i.e., within a few milliseconds.) Activation signals from the detector circuits are sent to protective relays, which initiate opening of the circuit. The nature of the relays generally requires 3–6 AC line cycles (i.e., up to 100 millisecs) to open. When the breakers open, the fault is cleared. However, opening of the breakers triggers a sequence of cascading events, which in the extreme can cause voltage on that portion of the transmission and distribution system to collapse. Specifically, when the breakers open, the voltage is still low (i.e., almost zero) and, because a portion of the transmission system has in effect been removed, the impedance of the system dramatically increases causing the appearance of an artificially high load. In this state the voltage is depressed and the current serving the load sharply increases. The sharp increase in the current generates enormous losses in the transmission and distribution systems. In some cases, because the load and impedance is so high, the voltage on the grid may not return to normal, causing long-term voltage depression and the possible voltage collapse of the entire system. The potential for these voltage instability problems is further exacerbated as load requirements on the grid increase.

Reactive volt-amperes are expressed in VARs; a term coined from the first letters of the words "volt amperes reactive." Reactive volt-amperes considered over a period of time represent oscillations of energy between the source and the load. Their function is to supply the energy for establishing magnetic fields and charging capacitors, and to transfer this energy back to the source when the magnetic field collapses or when the capacitor discharges.

Note that the reactive power is due to quadrature components of voltage and current and as such represents no average real power. Although reactive volt-amperes, as such, require no average energy input to the generators their generation does consume a certain amount of generator volt-ampere capacity and thereby limits the available real power output of the generators. In addition, there is a resistive or $I^2R$ loss associated with the transfer of reactive power over the grid. This additional loss must also be made up by the generator and further limits the real power available to the grid. Note that although the $I^2R$ loss is caused by the transfer of reactive power, it is not part of the reactive power.

One approach for addressing the voltage stability problem discussed above is to construct additional transmission lines, reducing system impedance and thereby negating the effects of the high losses and sharp increase in current flow caused by the opening of the breaker. However, providing such additional lines is expensive and in certain settings extremely difficult.

Various equipment and device solutions have also been developed to address these voltage instability problems. In general, such devices provide mitigation by injecting real and/or reactive power into the system.

One such device, called the static VAR compensator (SVC), provides reactive power from a bank of capacitors when a fault is experienced at a particular load. In particular, the SVC rapidly delivers the reactive power delivered by the SVC shifts the phase angle, thereby raising the voltage on the network. The SVC continuously shifts the phase angle in response to dynamic power swings on the transmission network due to changing system conditions.

Other devices including batteries and superconducting magnetic energy storage (SMES) differ from SVCs in that they can provide real as well as reactive power to loads. For example, a SMES stores electrical energy provided from the grid in a magnetic field generated by a DC current flowing through a coiled superconducting wire. An approach for using a SMES is to provide power to the load in response to a detected fault after the load is isolated from the grid. Because the SMES, like a battery, is a DC device, a power conditioning system is generally required in order to interface it to an AC utility grid. Thus, the power conditioning system generally includes DC/AC converters as well as other filtering and control circuitry.

SUMMARY OF THE INVENTION

The invention features an approach for stabilizing the voltage on a utility power system or network by reducing, during a fault recovery period, the overall real and reactive power losses of the utility power system. By "utility power system or network", it is meant those systems or networks having at least one distribution line network coupled to a higher voltage transmission line network designed to carry a nominal voltage under normal operating conditions. The distribution line network generally includes at least one distribution feed having a load and carries voltages at levels lower than those on the transmission network. The invention reduces the transmission losses by delivering real and reactive power from a voltage recovery device at one or more predetermined locations on the utility power system.

One general aspect of the invention relates to a voltage recovery device for connection to a utility network, which carries a nominal voltage. In this aspect, the voltage recovery device includes an energy storage unit connected to the utility power network and configured to transfer real and reactive power between the utility power network and voltage recovery device at a sufficient level and for a sufficient duration to recover the voltage on the utility power network to within a predetermined proportion of the nominal voltage, following a fault condition detected on the utility power network.

Unlike conventional fault recovery approaches, the voltage recovery device focuses on maintaining the stability of the voltage on the utility power system, rather than on maintaining the voltage on a particular load. For example, stabilizing the voltage on the transmission line is accomplished by reducing the overall losses of the utility power system. In particular, any abnormally high real and reactive power losses created by the transfer of real and reactive power to the ultimate load causing an abnormally large voltage drop and shift in the phase angle are reduced. These abnormally high losses are reduced more efficiently and effectively when real and reactive power is injected or absorbed on the distribution network rather than on the transmission network.

In essence, the invention attempts to reduce losses on the utility power system, which are typically two to three times larger than the losses encountered with the transmission system intact (i.e., the transmission system without portions removed or decoupled). By eliminating these larger losses, the system is less stressed during the period just after a fault is detected and the circuit breakers on the transmission network are opened.

Further, because the voltages on the distribution network are lower than those on the transmission-network, the design and installation of a voltage recovery device for the distribution network is simpler and easier. Reliability of the voltage recovery device is also higher.

Delivering and/or absorbing real and reactive power from a voltage recovery device on the distribution network, rather than on the transmission network, has several advantages. First, and most generally, the voltage recovery device is configured to provide the real and reactive power to a portion of the utility power network (i.e., the distribution line network) where a greater proportion of the total losses occur. Second, in specific cases where the fault occurs on the distribution network associated with the voltage recovery device, the voltage recovery device addresses the fault with virtually no impact on the transmission network. Thus, the transmission network operates with much greater stability.

Embodiments of the invention may include one or more of the following features.

In one embodiment, the energy storage unit includes a superconducting magnet, for example a SMES. A SMES device is particularly well suited as a voltage recovery device, because of its ability to rapidly respond to a detected fault and, thereafter, selectively deliver both real and reactive power to the distribution line. In particular, the SMES device is capable of supplying real power to a load connected to the distribution line for a finite time duration, as well as reactive power to the network indefinitely. In alternative embodiments, the energy storage unit is selected from a group consisting of a flywheel energy storage device, a battery, a capacitive energy storage system, a compressed gas energy storage unit, and a fuel cell and its associated energy source.

The voltage recovery device is configured to recover the voltage on the transmission line network to a level conforming to nominal utility planning criteria. Typical utility planning criteria consider a network to be recovered when the network voltage is in a range between 0.8 and 0.95 P.U. (Per Unit) of nominal, and preferably between 0.9 and 0.95 P.U. within 0.5 seconds of clearing the fault.

The voltage recovery device further includes an inverter, electrically coupled between the energy storage unit and the utility power network, and a controller connected to the inverter and configured to control the amount of real and reactive power transferred between the energy storage unit and utility power network. Thus, the inverter allows bidirectional flow of energy to and from the energy storage unit. In certain circumstances, such as when the energy storage unit is incapable of absorbing energy (or additional energy), when energy is transferred from the utility power network to the inverter, resistors within the inverter may be used to dissipate the transferred energy.

The invention further includes a method of discharging the energy storage unit, which may be a SMES device, selectively at either substantially constant voltage or substantially constant power. The method of discharging the energy storage device at substantially constant voltage constitutes a means of delivering a significant portion of the stored energy of the device during the first part of the discharge period. This has a significantly beneficial effect on the utility distribution network in that it provides a large amount of real power during the initial period following the initiation of the fault. It is during this period that the utility distribution and transmission networks experience the greatest impact of the increased losses due to the fault. By injecting a substantially larger portion of the storage device's stored energy during this period these losses may be mitigated more effectively. The discharge of an energy storage device such as a SMES, flywheel or other device at constant voltage is advantageous due to the fact that the stored energy in the device varies accordingly to the second power of some variable (current in this case of a SMES, rotational velocity in the case of a flywheel). The power discharged from this type of device varies as the rate of change of this variable (current or rotational velocity, for example), times the instantaneous value of the variable (current or rotational velocity, for example). When the device is subjected to constant voltage discharge, the product of these two factors is maximized at the first instance of discharge and decreases proportional to the square of elapsed discharge time thereafter. This method provides the maximum amount of power from the device initially following the start of discharge, which is advantageous to the mitigation of losses on the attached utility transmission and distribution network, as it taught above. In addition, the method of discharging the energy storage device at substantially constant voltage allows for a simpler and more efficient interface between the energy storage device and the attached inverter compared to that required for implementation of the method of discharging the device at substantially constant power.

Another aspect of the invention relates to a method for stabilizing a utility power network. The method includes electrically connecting a voltage recovery device to the distribution network. Upon detecting a fault condition on the utility power network, the voltage recovery device is activated within a predetermined time period following the fault, and provides real and reactive power to the transmission network at a sufficient level to recover the voltage on the utility power network to within a predetermined proportion of the nominal.

In one application of this aspect of the invention, the utility power network includes a transmission network and a distribution network electrically connected to the transmission network. The distribution network has distribution lines coupled to at least one load. The method further includes electrically connecting the voltage recovery device to the distribution network.

The method may include one or more of the following additional steps. The method may further include electrically coupling an inverter between the energy storage unit and the utility power network. The inverter is then controlled to control the level of real power and level of reactive power transferred between the energy storage unit and utility power network. The voltage recovery device is configured to provide a combination of real and reactive power.

In certain embodiments, the voltage recovery device provides real power to the transmission network to promote quick recovery of voltage to within acceptable utility standards within 0.5 seconds. The voltage recovery device provides real and reactive power to the transmission line network to restore voltage to within 0.90 P.U. of the nominal voltage within 5 seconds.

In still another aspect of the invention, a control system includes a memory including at least a portion for storing a computer program for controlling a voltage recovery device electrically coupled to a utility power network, a processor to execute the computer-readable instructions, and a bus connecting the memory to the processor. The stored program includes computer-readable instructions which, in response to an indication of a detected fault, provides control signals to the voltage recovery device to control the transfer of real power and reactive power to the utility power network at a sufficient level and for a sufficient duration to recover the voltage on the transmission network to within a predetermined proportion of the nominal voltage.

Another aspect of the invention relates to the fact that utility transmission and distribution networks typically consist of multiple lines and loads and that any of these lines and loads are subject to faults. Therefore, it may be advantageous to install a plurality of these voltage recovery devices on a particular utility network. In this embodiment of the invention, individual, self-contained, voltage recovery devices, consisting of the energy storage device, the inverter and associates controls connected to the distribution line as described above, are installed at multiple points on the transmission and distribution network. These individual devices each operate as described below to mitigate the effects of faults on the transmission and distribution network. The plurality of devices, distributed over the network, provides a significantly advantageous effect over the effect provided by a single device of energy and power capability equal to the sum of the plurality of devices. This advantageous effect is achieved to a great extent by the closer match between the capacity of the individual devices and the capacity of the transmission and distribution lines to which they are attached.

These and other features and advantages of the invention will be apparent from the following description of a presently preferred embodiment, and from the claims.

DETAILED DESCRIPTION

Figure 4:
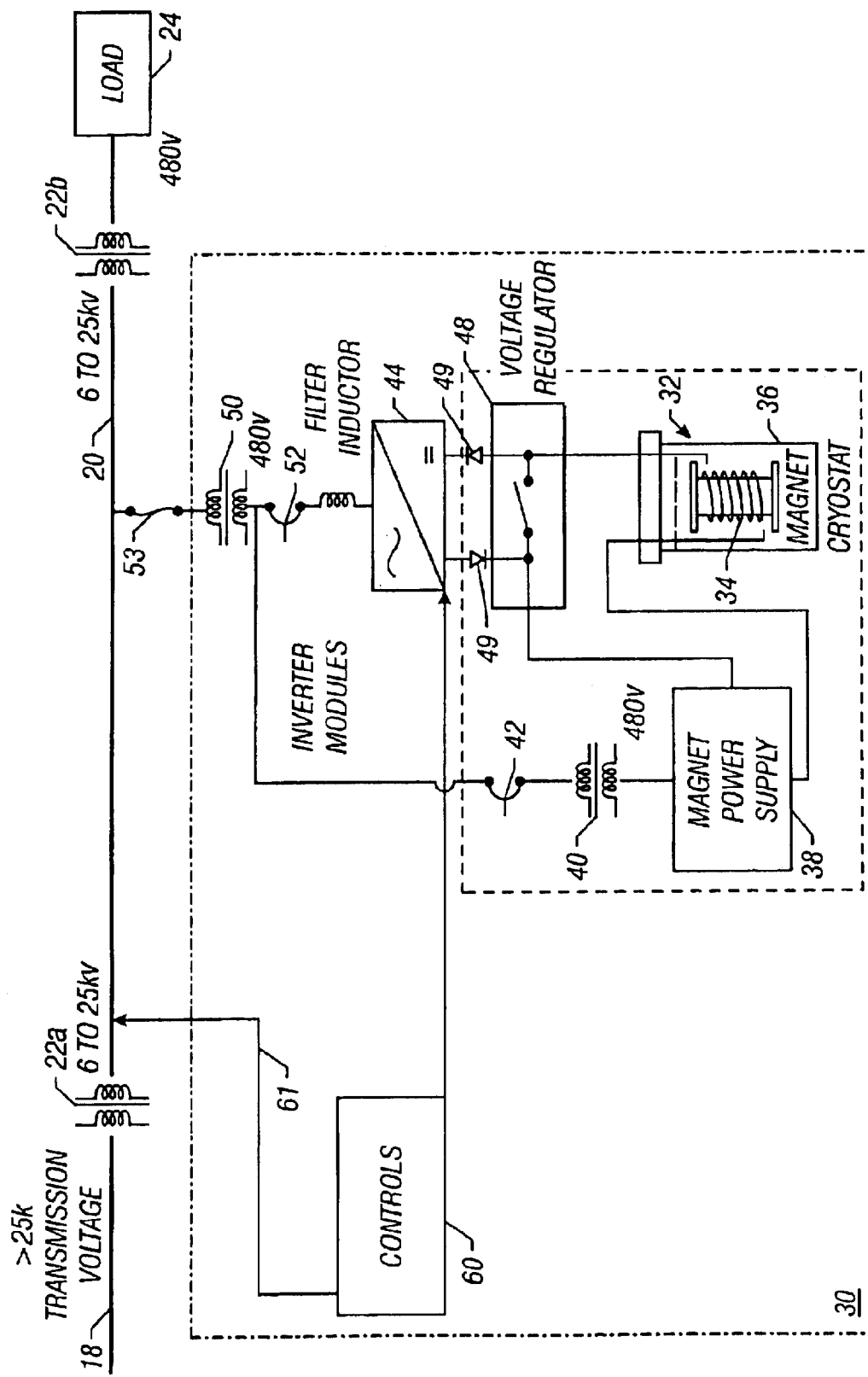
FIG. 4 is a block diagram representation of a SMES device connected to a distribution line of FIG. 2.

Referring to FIG. 4, a distributed SMES or D-SMES module 30 is shown connected in shunt with a distribution line 20 of a distribution line network. In general, D-SMES module 30 is capable of delivering both real and reactive power, separately or in combination, to a transmission line network. In this embodiment, D-SMES module 30 is sized at 2.8 MVA and is capable of delivering an average of 2 MWatts for periods as long as 400 milliseconds, 5.6 MVA for a full second, and 2.8 MVAR of reactive power indefinitely.

Distribution line 20 is shown connected to a transmission line 18 of the transmission line network through a first transformer 22a, which steps down the higher voltage (e.g., greater than 25 kV carried on transmission line 18 to a lower voltage, here 6kV. A second transformer 22b steps down the 6kV to a voltage suitable for a load 24, here 480 V.

D-SMES module 30 includes a superconducting magnetic energy storage unit 32 having an energy storage magnetic coil 34 positioned within a containment vessel 36 of a cryogenic refrigeration unit. Energy storage unit 32 also includes a magnet power supply 38. Containment vessel 36 maintains magnetic coil 34 in liquid helium, and is fabricated of two. austenitic stainless steel vessels separated by a vacuum insulated space. In the embodiment shown, the cryogenic refrigerant unit includes one or more Gifford-McMahon type coolers (not shown), operating in concert, to maintain operating temperatures within vessel 36 and to re-liquify any helium vapor building up within the vessel. No helium (liquid or gaseous) circulates outside vessel 36 under normal operating conditions. The external, room temperature, refrigeration system gasses are not interchanged with the internal helium supply. The system design permits continued system operation, with one or both coolers inoperable, for a minimum of 48 hours.

Superconducting magnetic coil 34 is fabricated from superconducting cable formed from niobium-titanium copper-based matrix wire, cabled into a mechanically stable form, and insulated prior to winding. A superconducting magnetic coil well-suited for use with D-SMES module 30 is available from American Superconductor Corporation, Westborough, Mass. Energy storage unit 32 also includes a magnet power supply 38 for charging magnetic coil 34, a magnet interface 48, an isolation transformer 40, and a breaker or contactor 42. Power supply 38 is available from Dynapower Corporation of South Burlington, Vt. In this embodiment, power supply 38 receives AC power from distribution line 20 through an isolation transformer 40 as well as a step-down transformer 50 and delivers DC power to magnetic energy storage unit 32. The breaker 42 is positioned between isolation transformer 40 and step-down transformer 50 and allows power supply 38 to be easily inserted and removed, thereby facilitating maintenance of the power supply. Superconducting magnetic energy storage unit 32 interfaces with an inverter system 44 through magnet interface 48 and a pair of steering diodes 49. Steering diodes 49 ensure that power flows only from energy storage unit 32 to inverter system 44 and not in the opposite direction.

Figure 5:
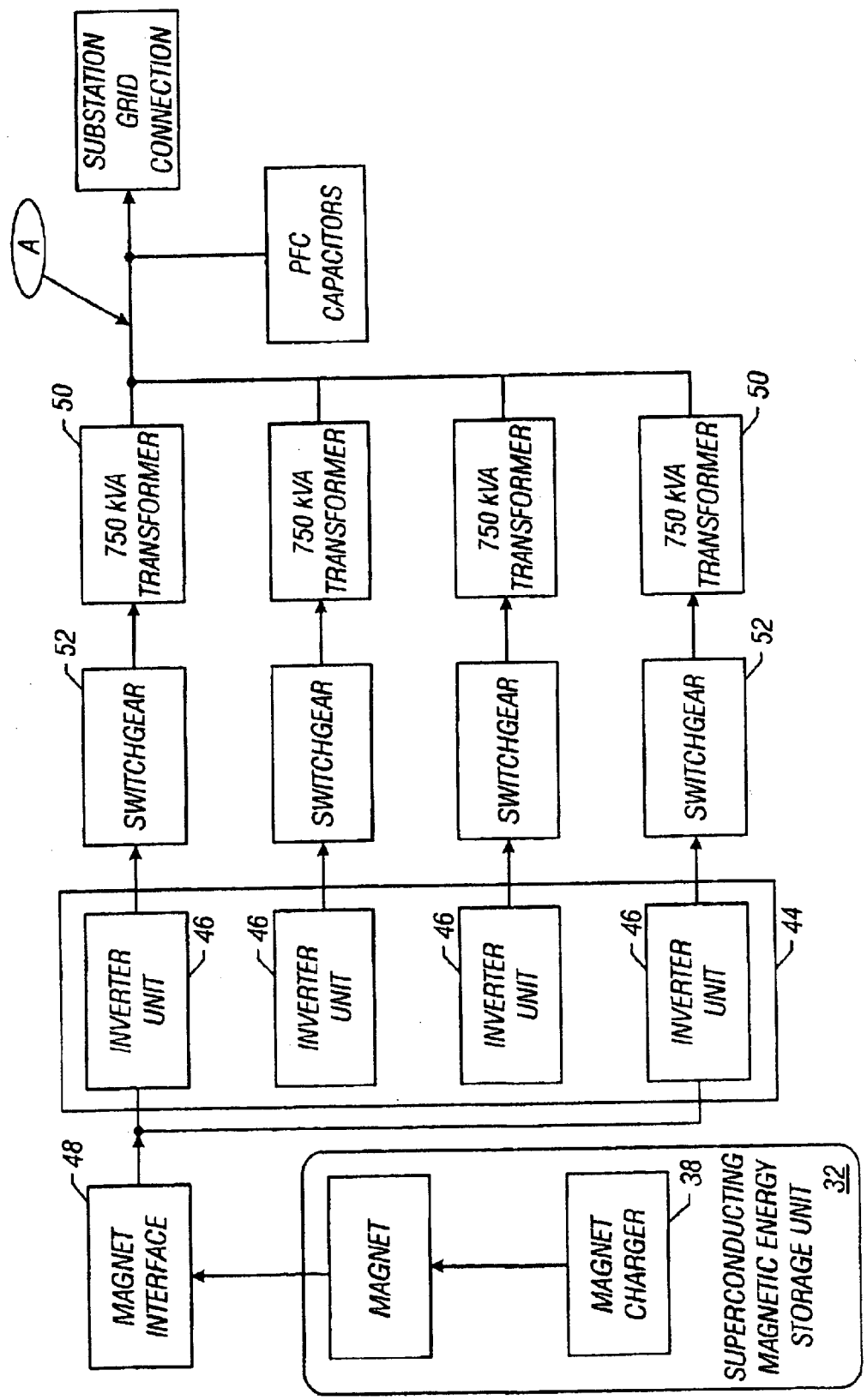
FIG. 5 is a schematic representation of a SMES device connected to a distribution line of FIG. 2.

Referring to FIG. 5, inverter system 44 converts DC voltage from D-SMES module 30 to AC voltage and, in this embodiment, includes four inverter units 46 (FIG. 5). In general, inverter 44 acts as a source for both real power and reactive power in any combination. The inverter can source real power only as long as real power is available from energy storage unit 32. However, inverter 44 can source reactive power indefinitely assuming the inverter is operating at its nominally rated capacity. More accurately, inverter 44 can receive reactive power from other sources, including the utility power network itself, and transfer that reactive power back to the utility power network at the desired magnitude and phase. Thus, inverter 44 can provide or transfer reactive power without power from energy storage unit 32.

Figure 8:
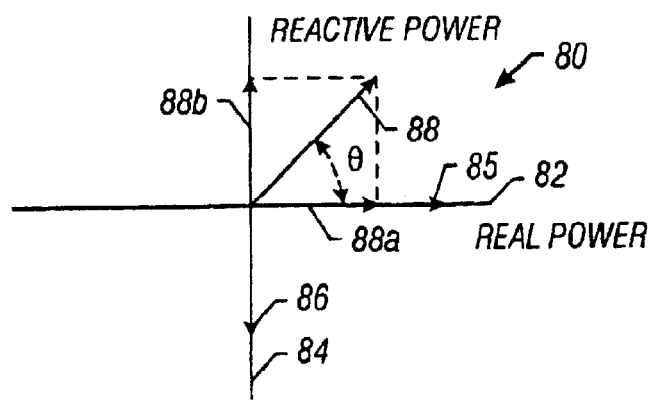
FIG. 8 is a graphical representation of vectors representing the power transferred between the utility power network and a D-SMES voltage recovery device.

In essence, inverter 44 represents a four-quadrant device capable of providing as well as absorbing power having both a real power component and a reactive power component. Referring to FIG. 8, a graph 80 having a real power axis 82 and a reactive power axis 84 can be used to illustrate a vector representation of the power transferred by the voltage recovery device 30. A vector having a magnitude and phase angle can lie in any of the four quadrants of graph 80. For example, in response to control signals from a system control unit 60 (described in greater detail below), inverter 44 can transfer power represented by vectors 85 or 86 having only a positive real power and a negative reactive power component, respectively. On the other hand, power, represented here by a vector 88, may have a real power component 88a and a reactive power component 88b. Thus, the magnitude (length of the vector) and phase angle ($\theta$) of the power can be controlled to define a predetermined locus. In certain applications, inverter 44 is operated in pulsed mode to reduce cost.

Each inverter unit 46 is capable of providing 700 KVA continuously and 1.4 MVA in overload for one second. The outputs of each inverter unit 46 are combined on the medium-voltage side of the power transformers to yield the system ratings in accordance with the following table.

| Power Flow | Value | Duration |
| --- | --- | --- |
| MVA delivered, leading or lagging | 2.8 | Continuously |
| MVA delivered, leading or lagging, overload condition | 5.60 | One second in event of transmission or distribution fault detection |
| Average MW delivered to utility | 2.0 | 0.4 seconds in event of transmission or distribution fault detection |

Each inverter unit 46 includes three inverter modules (not shown). Because inverter units 46 are modular in form, a degree of versatility is provided to accommodate other system ratings with standard, inverter modules. A level of fault tolerance is also possible with this modular approach, although system capability may be reduced. Each inverter module is equipped with a local Slave Controller that manages local functions such as device protection, current regulation, thermal protection, power balance among modules, and diagnostics, among others. Inverter units and modules are mounted in racks with integral power distribution and cooling systems.

Inverter system 44 is coupled to distribution line 20 through step-down transformers 50 and switch gear units 52. Each power transformer 50 is a 24.9 kV/480 V three-phase oil filled pad mount transformer having a nominal impedance of 5.75% on its own base rating. The power transformers are generally mounted outdoors adjacent to the system enclosure with power cabling protected within an enclosed conduit (not shown). As is shown in FIG. 4, a fuse 53 is connected between step-down transformer 50 and distribution line 20.

Each switchgear unit 52 provides over-current protection between power transformers 50 and inverter units 46. Each of the four main inverter outputs feeds a circuit breaker rated at 480 V, 900 A RMS continuous per phase with 45 kA interruption capacity. Switchgear units 52 also serve as the primary disconnect means for safety and maintenance purposes, and may include voltage and ground fault monitoring. The switchgear units are generally mounted adjacent to the inverter unit enclosures.

Referring again to FIG. 4, system control unit 60 is a multiprocessor-driven system, which utilizes adaptive control algorithms. System control unit 60 operates as a multi-state machine for processing inputs from distribution line 20 and inverter units 46 of inverter system 44. System control unit 60, as a function of unit inputs and predetermined internal control rules, dynamically determines the phase and magnitude of inverter units 46 as well as the real power output of D-SMES module 30. System control unit 60, in operation, passes real time voltage and current waveform data to the data acquisition system for processing and transmission to monitoring sites. System control unit 60 also supports local user interfaces and safety interlocks. Control unit 60 necessarily has a response time sufficient to ensure that the transfer of power to or from voltage recovery device 30 occurs at a speed to address a fault or contingency on the utility system. In general, it is desirable that the fault is detected within 1 line cycle (i.e., 1/60 second for 60 Hz, 1/50 second for 50 Hz). In one embodiment, the response time is less than 500 microseconds.

Figure 4A:
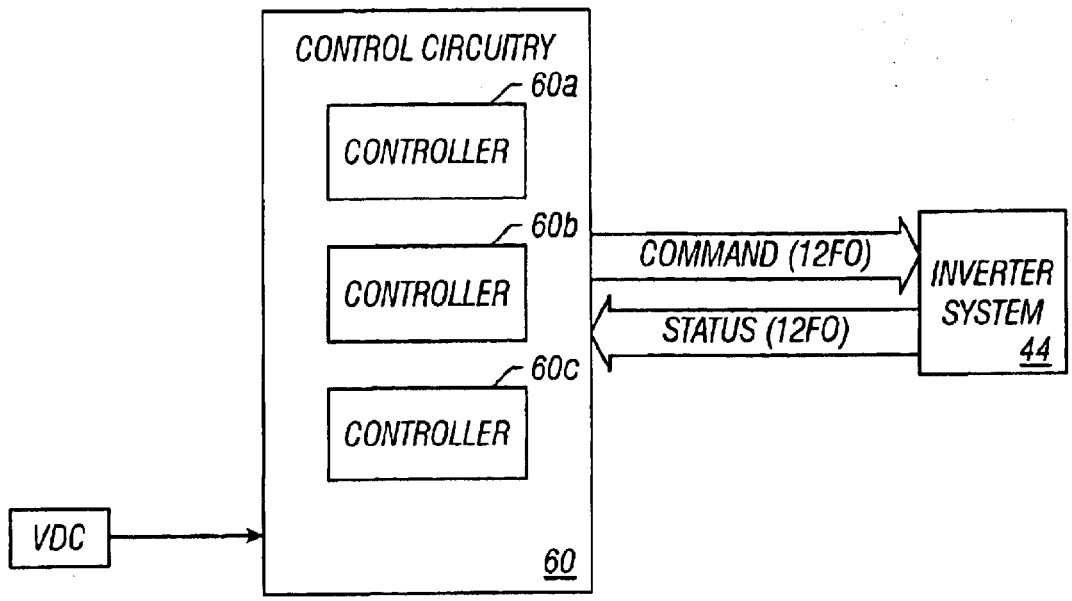
FIG. 4A is a block diagram of the controller of FIG. 4.

As shown in FIG. 4A, system control unit 60 may comprise three controllers 60a, 60b, and 60c (e.g., microprocessors) on a single circuit board. In addition, this circuitry includes appropriate driver circuits and analog-to-digital ("A/D") converters (not shown).

Controller 60a executes computer instructions to control circuit and voltage loops in inverter system 44. (for is use in dynamically varying the magnitude and phase of the power from inverter system 44, as described above). Controller 60b functions as the system controller, meaning that it executes computer instructions to detect an amount of power on the utility power network, and to provide this information to controller 60a. Controller 60c records information obtained by controllers 60a and 60b, formats that information, and displays it to a user. Although this embodiment shows three controllers, any number of controllers (e.g., one controller) can be used to perform the functions attributed to controllers 60a, 60b and 60c. The computer instructions executed in each controller may be stored in one or more memories (not shown) in controller 60 or an internal memory of each controller.

Figure 6:
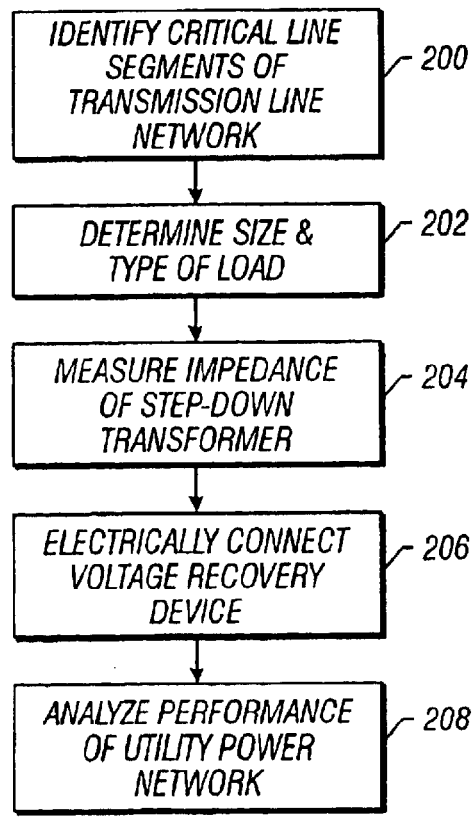
FIG. 6 is a flow diagram illustrating the general steps for determining optimal locations for connecting one or more voltage recovery devices.

Referring to FIG. 6, an approach for determining optimum positions for connecting D-SMES module 30 to distribution line 20 is described. At the outset, determining an optimum location for connecting D-SMES module 30 is highly advantageous to achieving the objective of reducing losses in the transmission system. D-SMES module 30 is connected to distribution line 20 rather than, for example, the transmission line, because of the distribution line's greater contribution of loss to the overall utility power network lines, that is, distribution line 20, relative to the transmission system, contributes a much greater percentage of the total losses of the overall utility power network. It is also important to appreciate that D-SMES module 30 is advantageously portable, thereby facilitating optimization of the system.

The first important step in locating appropriate D-SMES module connection locations is to determine critical line segments of the transmission line network (step 200). By "critical line segment", it is meant those line segments or other transmission system elements, which when subjected to a contingency or fault, result in a significant drop in the post contingency voltage on the transmission network. For example, a line segment having a fault which causes the voltage to drop below 0.9 per unit voltage (i.e., the voltage is less than 90% of the nominal voltage on the transmission system) would be considered a critical line segment.

Figure 1:
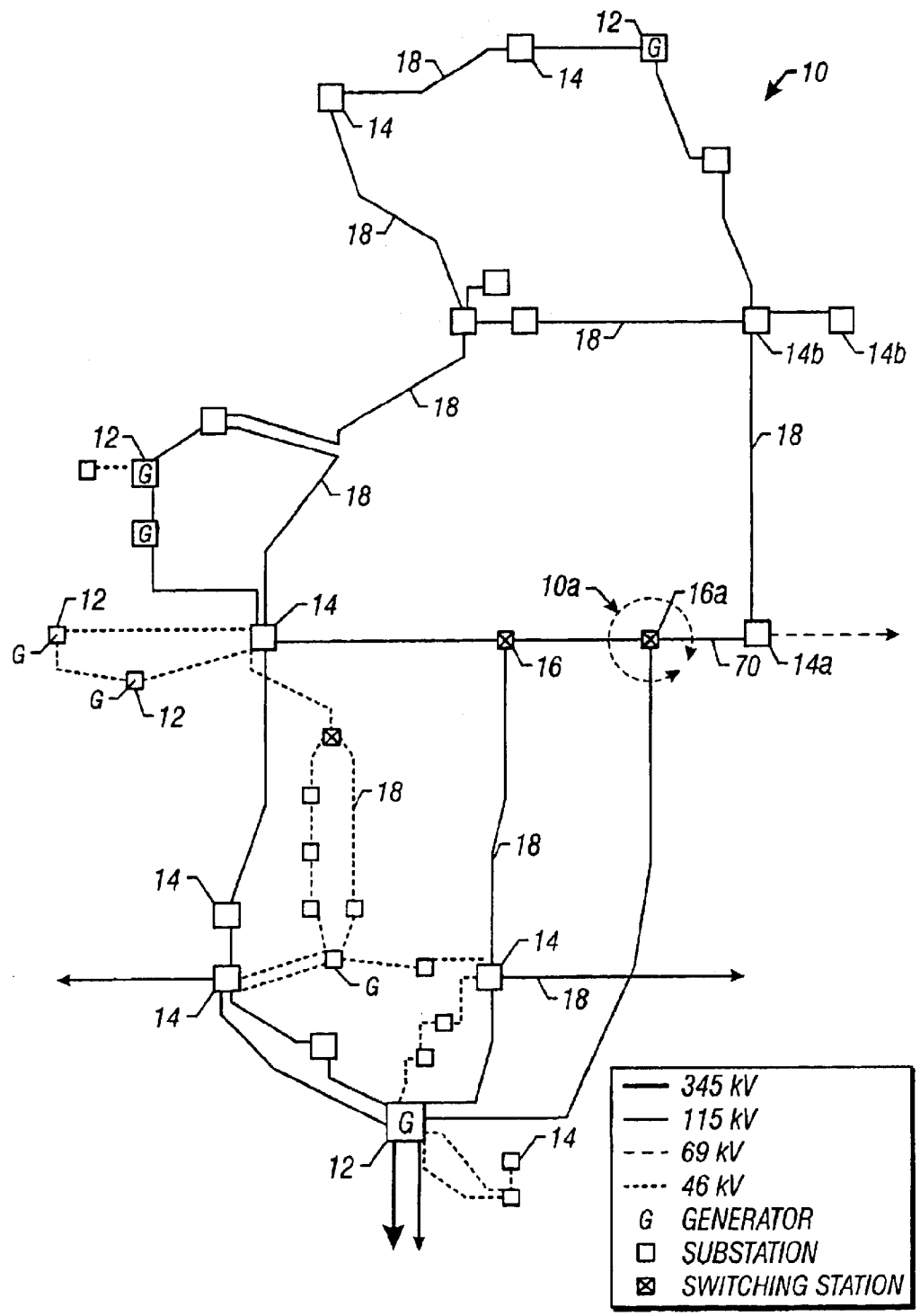
FIG. 1 is a diagrammatic representation of a portion of a transmission network.
Figure 2:
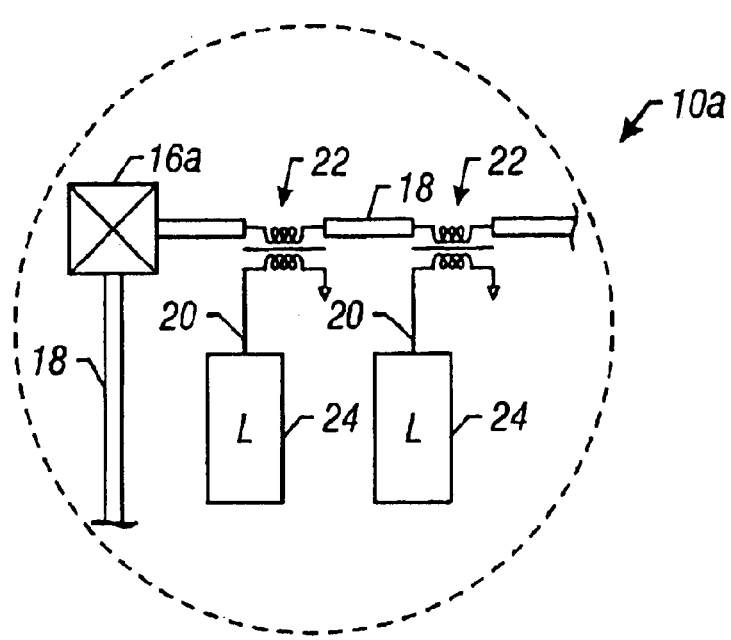
FIG. 2 is an enlarged section of the portion of the transmission network of FIG. 1 including distribution lines.
Figure 3:
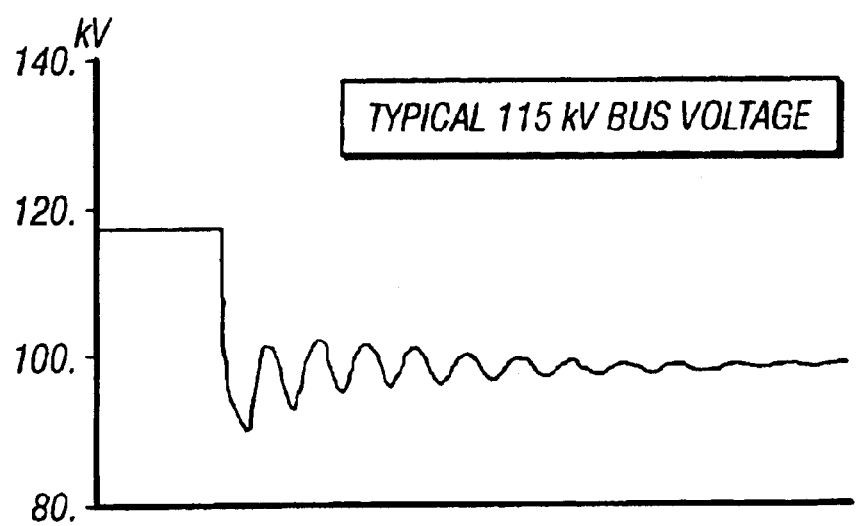
FIG. 3 is a graph illustrating the voltage profile of a section of the transmission network of FIG. 2 during a fault.

In order to determine which of a multitude of line segments is considered to be critical, one or more fault scenarios are simulated on all or a portion of the transmission network being analyzed. The transmission network is modeled, for example, using the PSE/E (Power Systems Simulator for Engineering) dynamic stability simulation model, a product of Power Technology, Inc., Schenectady, N.Y. The simulation model may represent only a portion of the utility power network, such as that shown in FIG. 1. On the other hand, the simulation model may represent a much larger geographic region, extending across several states.

Referring again to FIG. 1, for example, transmission line segment 70 extending between switching station 16a and substation 14a, represents such a critical line segment. This approximately 10 mile segment of transmission line network 10 is considered to be a critical line segment because, if opened, due to a detected fault occurring on the line, all loads on the eastern side of the loop (right-hand side of figure) must be served by generators on the western side of the loop (left-hand side of figure).

Assume for example that line segment 70 opens, thereby preventing further current flow on that segment. Once this occurs, the transmission network or a particular geographic area of the network is evaluated to determine which of the other segments are adversely affected by the opening of line segment 70. For example, substation 14b is severely and adversely affected by the opening of segment 70.

Once all critical line segments are identified (step 200), the size and type of loads connected to distribution lines associated with the identified critical line segments are then analyzed (step 202). In particular, a determination is made to ensure that the load to be compensated is at least as large as the real power output of the D-SMES module 30 which, in one embodiment, is 3 MW. In this example, only those distribution lines having loads greater than 3 MW are considered to be candidates for connecting a D-SMES module. Although connecting a D-SMES module to a distribution line having a load smaller than the output of the D-SMES module itself may still be beneficial, doing so is not an effective and efficient use of the D-SMES module.

It is also important to appreciate that other factors affect optimum positions of the D-SMES locations at any given time. The characteristics of a particular load may change on a temporal basis. In particular, the size and type of the, load may change significantly depending on the season. For example, in summer, the load may be a heating ventilation air conditioning (HVAC) system, a motor-driven type of load. On the other hand, in winter, the load can be a resistive heating load. Resistive heating loads are much different than motor driven loads in that, when the voltage goes down on a resistive load, the power required by that resistive load goes down with it. On the other hand, a motor-driven load is generally a constant power load and the current goes up to maintain the constant power as the voltage decreases. In turn, if the current increases, the losses also increase and the voltage instability problem is created. Thus, the "type" of load is always important in determining where the D-SMES module should be connected on the network. In such situations, the D-SMES modules can easily and advantageously be moved to a location which most effectively maintains the voltage stability of the transmission system.

Figure 4B:
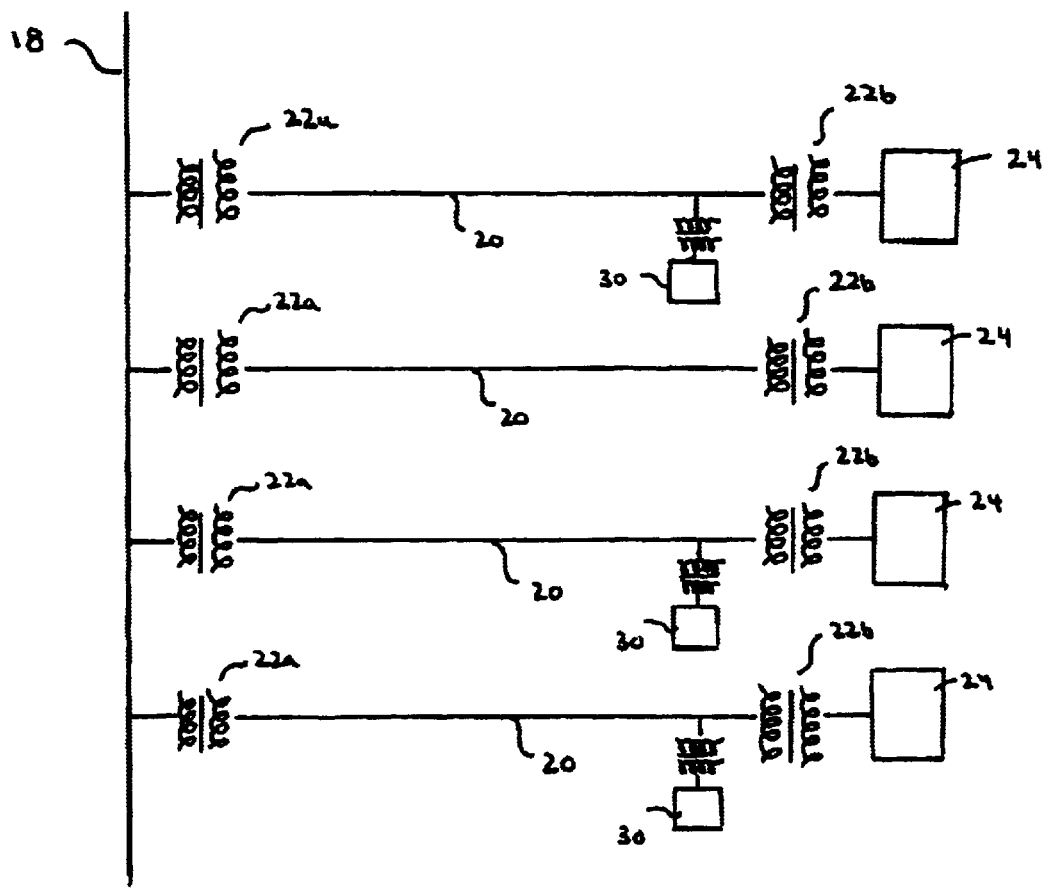
FIG. 4B is a block diagram of a utility power network with a plurality of voltage recovery devices.

The impedances of all step-down transformers used to couple each identified critical line segment of the transmission network and distribution line are then measured (step 204). In general, the impedance is reactive. The step-down transformers are evaluated because of the significant amount of loss they contribute to the overall loss in a utility power network. The inductance of these transformers can contribute as much as 40% of the total loss. Those transformers having the highest impedances are then selected as candidates for connection to a D-SMES module. If, for example, three D-SMES modules are available for use, the three identified critical line segments will be those meeting the minimum load requirement and having the three highest step-down transformer impedances would be selected for installation of D-SMES devices (step 206) (See FIG. 4B).

The system is then re-evaluated to determine whether the placement of D-SMES modules at the selected locations achieves the desired effect (step 208). It may be desirable to empirically move one or more of the D-SMES modules to see if the improvement can be further augmented. The location achieving the optimum result (i.e., lowest transmission loss and maximum stability of the transmission system) is then used in actual operation.

Referring again to FIG. 4, system control unit 60 monitors, via sensing line 61, the voltage on distribution line 20. If the voltage drops below a predetermined threshold value (e.g., typically below 0.9 P.U. of the nominal voltage), control unit 60 sends a signal to inverter system 44 to cause magnetic energy storage unit 32 to deliver full power output to distribution line 20. In operation, control unit 60 sends the control signal to inverters 44 within approximately 500 microseconds of the fault being detected. It is important to note that the breakers on the transmission network require approximately 60 milliseconds from initiation of the fault to open. Thus, D-SMES module 30 is supplying both real and reactive power prior to the breakers opening.

By full power output, it is meant all of the real power that D-SMES module 30 can produce supplemented by reactive power from inverter unit 44. In this embodiment, D-SMES module 30 is configured to provide an average 2 MWatts of real power as well as between 2 and 5.6 MVARs of reactive power. Within one millisecond of the fault being detected, D-SMES module 30 is capable of delivering sufficient real power to quickly (e.g. typically within 0.5 seconds) bring the voltage on the line to within acceptable levels. At this point, any loads on the distribution line become operational, thereby producing reactive power loss on the line. Control unit 60 then terminates delivery of real power and increases, if necessary, generation of reactive power from D-SMES module 30 to counteract the reactive imbalance and can do so indefinitely. Thus, within 0.5 seconds of a fault being detected and cleared, magnetic energy storage unit 32 is capable of restoring the system to a minimum acceptable level (typically 0.9 P.U.—a well accepted industry standard) of the nominal voltage through the delivery of both real and reactive power. And, within 5 seconds of the detected fault to a level that is acceptable (typically 0.95 P.U.) for normal long-term continuous operation of the system through the generation of reactive power.

Figure 7:
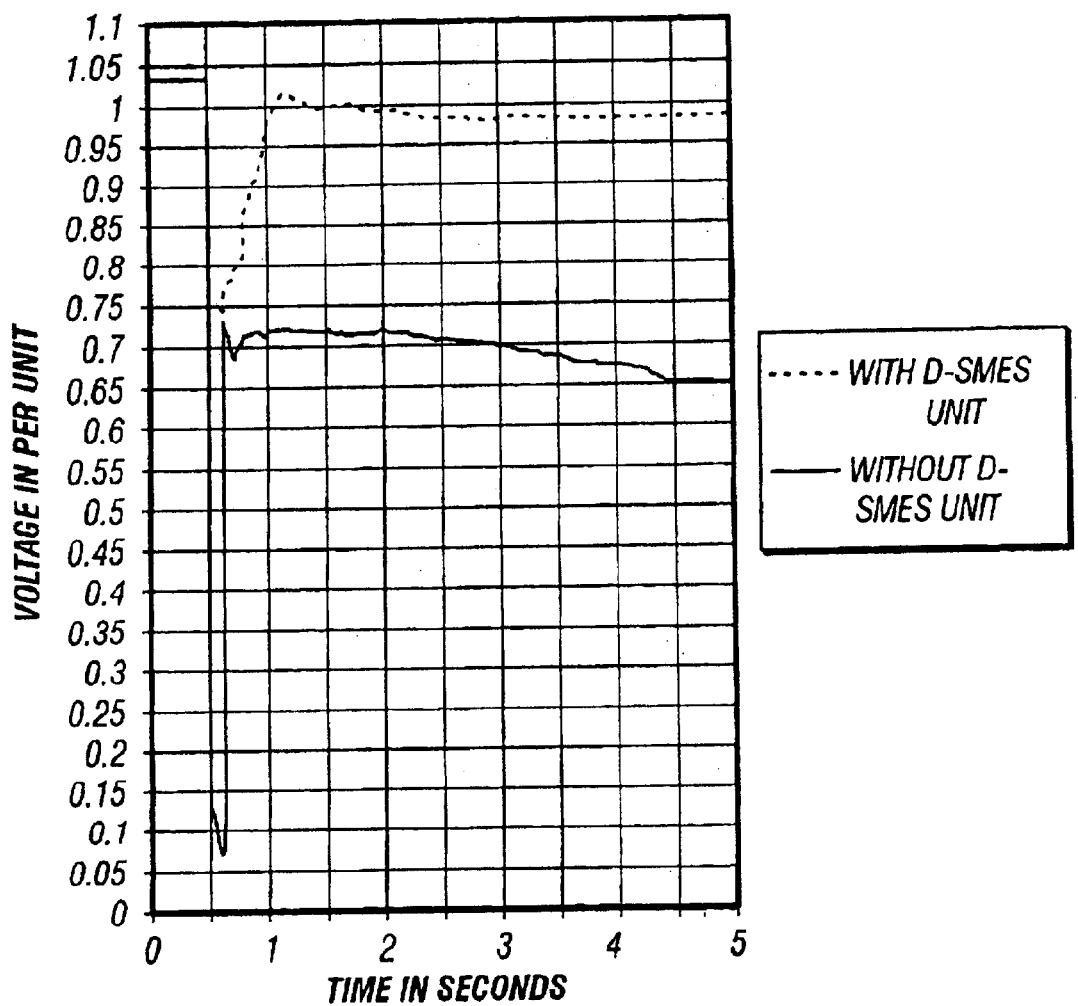
FIG. 7 is a graph showing voltage recovery characteristics with and without a D-SMES voltage recovery device for a section of the transmission line network of FIG. 1.

Referring to FIG. 7, for example, it can be seen that system voltage returns to approximately 0.7 P.U. within about 0.1 seconds following the clearing of the fault. At this point, the system voltage is the same with or without a D-SMES device installed. The solid line on FIG. 7 shows that without a D-SMES device, voltage does not recover and in fact will decrease with time following clearing of the fault. However, with a D-SMES device installed, the voltage quickly recovers to 0.90 P.U. within 0.5 seconds and to 0.95 P.U. within another 0.1 seconds. The dashed line on FIG. 7 indicates the voltage recovery with a D-SMES unit installed. In situations like this, the installation of a D-SMES system will determine whether the system goes into voltage collapse or recovers within a specified time period.

Other embodiments are within the scope of the claims. For example, in the embodiment described above in conjunction with FIGS. 4–7, a D-SMES unit was used to provide the real and reactive power needed to recover the voltage on the transmission network. However, it is important to appreciate that other voltage recovery devices capable of providing either real or reactive power, or both, including flywheels, batteries, capacitive energy storage system bank, compressed gas energy sources, and fuel cell systems (e.g., those that convert carbon based fuels into electricity and its associated energy source) are also within the scope of the invention.

What is claimed is:

1. A voltage recovery device for connection to a utility power network including a transmission line which carries a nominal voltage and a distribution line network connected to the transmission line network, the distribution line network carrying a distribution voltage less than the nominal voltage on the transmission line network, the voltage recovery device comprising an energy storage unit connected in shunt to the distribution line network and configured to transfer real and reactive power between the utility power network and voltage recovery device at a level and for a duration to recover the voltage on the utility power network to within a predetermined proportion of the nominal voltage, following a fault condition detected on the utility power network.

2. The voltage recovery device of claim 1 wherein the voltage recovery device is configured to transfer a combination of real and reactive power.

3. The voltage recovery device of claim 2 wherein the voltage recovery device is configured to provide real and reactive power to the utility power network to within 0.90 P.U. of the nominal voltage within 0.5 seconds.

4. The voltage recovery device of claim 2 further comprising:
   an inverter electrically coupled to the distribution line network; and
   a controller connected to the inverter and configured to control the amount of real and reactive power transferred between the energy storage unit and the distribution line network.

5. The voltage recovery device of claim 4 wherein the energy storage unit includes a superconducting magnet.

6. The voltage recovery device of claim 4 wherein the energy storage unit is selected from a group consisting of a flywheel, a battery, a capacitive energy storage system bank, a compressed gas energy source, and a fuel cell system.

7. The voltage recovery device of claim 4 further comprising a magnet interface connected between the energy storage unit and the inverter.

8. The voltage recovery device of claim 1, wherein the real power is transferred from the voltage recovery device at a substantially constant voltage for a predetermined period of time.

9. The voltage recovery device of claim 8, wherein, after the predetermined period of time, the real power is transferred from the voltage recovery device at a substantially constant rate.

10. A method of stabilizing a utility power network including a transmission line which carries a nominal voltage and a distribution line network connected to the transmission line network, the distribution line network carrying a distribution voltage less than the nominal voltage on the transmission line network, the method comprising:

electrically connecting in shunt a voltage recovery device having an energy storage unit to the distribution line network, detecting a fault condition on the utility power network; and operating, in response to detecting the fault condition, the voltage recovery device to transfer real power and reactive power to the distribution line network at a level and for a duration to recover the voltage on the utility power network to within a predetermined proportion of the nominal voltage.

11. The method of claim 10 further comprising electrically coupling an inverter to the distribution line network, wherein operating the voltage recovery device including controlling the inverter to control the level of real power and level of reactive power transferred between the energy storage unit and the distribution line network.

12. The method of claim 10 further comprising configuring the voltage recovery device to provide real and reactive power to the transmission network to promote quick recovery of voltage to within acceptable utility standards within 0.5 seconds.

13. The method of claim 10 further comprising configuring the voltage recovery device to provide real and reactive power to the transmission network to within 0.90 P.U. of the nominal voltage within 0.5 seconds.

14. The method of claim 10 wherein the energy storage unit includes a superconducting magnet.

15. The method of claim 10 wherein the energy storage unit is selected from a group consisting of a flywheel, a battery, a capacitive energy storage system bank, a compressed gas energy source, and a fuel cell system.

16. The method of claim 10, wherein the real power is transferred from the voltage recovery device at a substantially constant voltage for a predetermined period of time.

17. The method of claim 16, wherein, after the predetermined period of time, the real power is transferred from the voltage recovery device at a substantially constant rate.

18. A method of stabilizing a utility power network wherein the utility power network includes a transmission network and a distribution network, the method comprising:

electrically connecting in shunt plural voltage recovery devices, each having an energy storage unit, to the distribution network, detecting a fault condition on the utility power network; and operating, in response to detecting the fault condition, the voltage recovery devices to transfer real power and reactive power to the utility power network at a level and for a duration to recover the voltage on the transmission network to within a predetermined proportion of a nominal voltage.

19. The method of claim 18 wherein operating one or more of the voltage recovery devices such that the transfer of real power and reactive power to the utility power network in aggregate is at a level and for a duration to recover the voltage on the transmission network to within a predetermined proportion of a nominal voltage.

20. The method of claim 18 further comprising electrically connecting each of the plural voltage recovery devices at line segments of the transmission network having a fault which causes the voltage on the line segment to be less than 90% of the nominal voltage.

21. The method of claim 19 further comprising electrically connecting each of the plural voltage recovery devices at line segments of the transmission network having a fault which causes the voltage on the line segment to be less than 90% of the nominal voltage.

22. A utility power network comprising:

a transmission line network carrying a nominal voltage;

a plurality of distribution line networks, each connected to the transmission line network, each of the distribution line networks carrying a distribution voltage less than the nominal voltage on the transmission line network; and a plurality of voltage recovery devices, each connected in shunt to at least one of the distribution line networks, and each of the plurality of voltage recovery devices is configured to transfer real and reactive power between the distribution line network and the voltage recovery device at a level and for a duration to recover the voltage on the utility power network to within a predetermined proportion of the nominal voltage of the transmission line network, following a fault condition detected on the utility power network.

23. The utility power network of claim 22 wherein each of the voltage recovery devices is configured to transfer a combination of real and reactive power.

24. The utility power network of claim 23 wherein each of the voltage recovery device is configured to provide real and reactive power to the utility power network to within 0.90 P.U. of the nominal voltage within 0.5 seconds.

25. The utility power network of claim 23 wherein each of the voltage recovery device comprises:

an inverter electrically coupled between the energy storage unit and one of the distribution line networks; and a controller connected to the inverter and configured to control the amount of real and reactive power transferred between the energy storage unit and utility power network.

26. The utility power network of claim 25 wherein the energy storage unit includes a superconducting magnet.

27. The utility power network of claim 22 wherein each of the voltage recovery devices is configured to transfer real power and reactive power to the utility power network in aggregate is at a level and for a duration to recover the voltage on the transmission network to within a predetermined proportion of a nominal voltage.

28. The utility power network of claim 22 wherein each of the plural voltage recovery devices is connected at line segments of the transmission network having a fault which causes the voltage on the line segment to be less than 90% of the nominal voltage.

29. The utility power network of claim 27 wherein each of the plural voltage recovery devices is connected at line segments of the transmission network having a fault which causes the voltage on the line segment to be less than 90% of the nominal voltage.

* * * * *